(12) United States Patent
Imada

(10) Patent No.: US 8,765,878 B2
(45) Date of Patent: Jul. 1, 2014

(54) RESIN COMPOSITION AND RESIN MOLDED PRODUCT

(71) Applicant: Fuji Xerox Co., Ltd., Tokyo (JP)

(72) Inventor: Akira Imada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/900,968

(22) Filed: May 23, 2013

(65) Prior Publication Data

US 2014/0114028 A1 Apr. 24, 2014

(30) Foreign Application Priority Data

Oct. 18, 2012 (JP) ................. 2012-231190

(51) Int. Cl.
*C08G 63/692* (2006.01)
*C08F 283/02* (2006.01)
*C08F 8/40* (2006.01)

(52) U.S. Cl.
USPC ........... 525/426; 528/287; 525/418; 525/419; 525/450

(58) Field of Classification Search
CPC .... C08F 283/01; C08F 283/02; C08F 283/14; C08F 283/045; C08F 283/06; C08F 283/065; C08G 69/48; C08G 63/6926; C08G 63/6928; C08G 63/6924; C08G 63/692; C08G 63/6922; C08G 79/04; C08G 79/06; C08G 79/25; C08L 79/085
USPC .............. 525/418, 419, 420, 420.5, 421, 426, 525/450; 528/287
See application file for complete search history.

(56) References Cited

U.S. PATENT DOCUMENTS 6,632,891 B1 10/2003 Tada et al.
2003/0166812 A1* 9/2003 Taniguchi et al. ............ 526/274

FOREIGN PATENT DOCUMENTS

| JP | A-59-096123 | 6/1984 |
|---|---|---|
| JP | A-6-184417 | 7/1994 |
| JP | A-7-33861 | 2/1995 |
| JP | A-11-255876 | 9/1999 |

* cited by examiner

*Primary Examiner* — Randy Gulakowski
*Assistant Examiner* — Christopher M Rodd
(74) *Attorney, Agent, or Firm* — Oliff PLC

(57) ABSTRACT

Provided is a resin composition including a compound in which a vinyl group in a side chain of a phosphazene compound is bonded to an α carbon in an aliphatic polyester resin.

10 Claims, No Drawings

RESIN COMPOSITION AND RESIN MOLDED PRODUCT

CROSS-REFERENCE TO RELATED APPLICATIONS

This application is based on and claims priority under 35 USC 119 from Japanese Patent Application No. 2012-231190 filed Oct. 18, 2012.

BACKGROUND

1. Technical Field

The present invention relates to a resin composition and a resin molded product.

2. Related Art

Heretofore, a polymer material such as a polystyrene, a polystyrene-ABS resin copolymer, a polycarbonate, a polyester, a polyphenylene sulfide, and a polyacetal have been used for components of electric products and electronic and electric equipment since they are excellent in heat resistance and mechanical strength, and in particular, in the retainability of mechanical strength against environmental changes in a case of the components of the electronic and electric equipment.

On the other hand, in recent years, from the viewpoint of environmental problems, investigation has been made for using a polylactic acid resin material instead of the polymeric materials described above since the polylactic acid resin material is a material of plant origin, causes a lower amount of $CO_2$ to be discharged and a lower amount of petroleum to be used, which is a depleting resource, and reduces environmental load.

SUMMARY

According to an aspect of the invention, there is provided a resin composition including a compound in which a vinyl group in a side chain of a phosphazene compound is bonded to an α carbon in an aliphatic polyester resin.

DETAILED DESCRIPTION

Hereinbelow, an exemplary embodiment of a resin composition and a resin molded product in the present invention will be described. Further, the present exemplary embodiment is one example for carrying out the present invention, and the present invention is not limited to the present exemplary embodiment.

Resin Composition

The resin composition in the present exemplary embodiment is a resin composition containing a compound in which a vinyl group in a side chain of a phosphazene compound is bonded to an α carbon in an aliphatic polyester resin. Further, the resin composition is hereinafter referred to as a "resin composition" in some cases.

In a resin material containing an aliphatic polyester resin such as a polylactic acid as a main raw material, it has been commonly known that incorporation of a flame retardant compound for improving the flame retardancy results in a decrease in mechanical strength. The resin composition in the present exemplary embodiment improves the mechanical strength without the deterioration of flame retardancy to a level unexpected in the related art when being used to make a molded product. The reason is not clear, but it is thought to be that by the chemical bonding of a phosphazene compound, for example, a phosphazene compound having a structure of the formula (1) shown below to an aliphatic polyester resin through a radical reaction, not through a transesterification reaction as in the related art, a "chemically crosslinked structure" is put into the resin composition in the present exemplary embodiment, and therefore, particularly, the flame retardancy is improved as well as excellent mechanical strength being achieved when being used to make a molded product.

Hereinbelow, the aliphatic polyester resin and the phosphazene compound will be described in detail.

Aliphatic Polyester Resin (A)

The aliphatic polyester resin (A) is largely classified into a microorganism-derived polymer, a synthetic polymer, and a semi-synthetic polymer. Examples of the microorganism-derived polymer include a polyhydroxybutyric acid and a polyhydroxyvaleric acid. Examples of the synthetic polymer include a condensate of a polycaprolactone, an aliphatic dicarboxylic acid, and an aliphatic diol. Examples of the semi-synthetic polymer include a polylactic acid polymer. These aliphatic polyester resins may be used singly or in combination of two or more kinds thereof.

Among these aliphatic polyester resins, from the viewpoints of processibility and biodecomposability, the semi-synthetic polymer is preferable and a polylactic acid polymer is more preferable. Particularly, the polylactic acid polymer may cope with the movement toward increasingly substituting a resin formed using a petroleum resource with a resin not using a petroleum resource since a lactic acid may be synthesized from a non-petroleum raw material such as sweet potatoes and corn.

Examples of the polylactic acid polymer include copolymers of a polylactic acid or lactic acid with other monomers. These polylactic acid polymers may be used singly or in combination of two or more kinds thereof.

Such other monomers may be any compound having two or more ester bond-forming functional groups, and examples thereof include a dicarboxylic acid, a polyol, a hydroxycarboxylic acid, and lactone.

Examples of the dicarboxylic acid include succinic acid, azelaic acid, sebacic acid, terephthalic acid, and isophthalic acid.

Examples of the polyol include aromatic polyols such as a bisphenol-ethylene oxide adduct compound; aliphatic polyols such as ethylene glycol, propylene glycol, butanediol, hexanediol, octanediol, glycerol, sorbitan, trimethylolpropane, and neopentyl glycol; and ether glycols such as diethylene glycol, triethylene glycol, polyethylene glycol, and polypropylene glycol.

Examples of the hydroxycarboxylic acid include glycolic acid, hydroxybutylcarboxylic acid, and those described in JP-A-6-184417.

Examples of the lactone include glycolide, ε-caprolactone glycolide, ε-caprolactone, ε-propiolactone, δ-butyrolactone, β-butyrolactone, γ-butyrolactone, pivalolactone, and δ-valerolactone.

As the method for synthesizing the polylactic acid polymer, any known synthesis methods may be used. Examples of the method for synthesizing the polylactic acid polymer include the synthesis method described in JP-A-7-33861; the synthesis method described in JP-A-59-96123; and the synthesis method described in "Polymer Preprints", Japan, vol. 44, 3198-3199. Specific examples thereof include a synthesis method involving direct dehydration condensation of a lactic acid and a synthesis method involving ring-opening polymerization of a lactide.

Examples of the lactic acid include L-lactic acid, D-lactic acid, and DL-lactic acid. These lactic acids may be used singly or in combination of two or more kinds thereof.

Examples of the lactide include L-lactide, D-lactide, DL-lactide, and meso-lactide. These lactides may be used singly or in combination of two or more kinds thereof.

The polylactic acid polymer is derived from plants and has an effect of decreasing environmental load, specifically, decreasing the amount of $CO_2$ discharged and decreasing the amount of petroleum used. The polylactic acid polymer is not particularly limited so long as it is a condensate of a lactic acid and may be a poly-L-lactic acid (hereinafter also referred to as "PLLA"), a poly-D-lactic acid (hereinafter also referred to as "PDLA"), or a mixture of PLLA and PDLA by copolymerization or blending. Further, the polylactic acid polymer may be a mixture of a poly-L-lactic acid and a poly-D-lactic acid and may be a stereo-complex type polylactic acid having high heat resistance, in which helical structures thereof are combined effectively (hereinafter also referred to as "SC-PLA"). Incidentally, as to the polylactic acid, either a synthesized product or a commercial product may be used. Examples of the commercial product include "TERRAMAC TE4000", "TERRAMAC TE2000", and "TERRAMAC TE7000"), all manufactured by Unitika Ltd., "LACEA H100" manufactured by Mitsui Chemicals Inc., and "Ingeo3001D" manufactured by Nature Works LLC. Further, the polylactic acids may be used singly or in combination of two or more kinds thereof. Incidentally, in the present exemplary embodiment, the polylactic acid may be contained as a main component of the resin composition. The "main component" as used herein means that it exceeds 50% by weight based on the entire amount of the resin composition.

Moreover, in a case of using the polylactic acid polymer as the aliphatic polyester resin, the molecular weight of the polylactic acid polymer is not particularly limited, and in the present exemplary embodiment, the weight average molecular weight of the polylactic acid is from 8,000 to 200,000, and preferably from 15,000 to 120,000. In a case where the weight average molecular weight of the polylactic acid polymer is less than 8,000, the combustion speed of the resin composition increases and the mechanical strength at low temperature tends to be lowered when made into a molded product. On the other hand, in a case where the weight average molecular weight of the polylactic acid polymer exceeds 200,000, the flexibility is lowered and the self-extinction by dripping of the resin composition is deteriorated. The flame retardancy tends to be lowered in any of the cases when made into a molded product. The "self-extinction by dripping" means that the resin composition is dripped by the heat and disappears.

The weight average molecular weight of the polylactic acid polymer in the resin composition means a weight average molecular weight obtained by cooling the resin composition in a liquid nitrogen atmosphere, scraping off a specimen for measurement from the surface thereof, dissolving the specimen for measurement at a concentration of 0.1% by weight in deuterated chloroform and measuring the separated polylactic acid by a gel permeation chromatograph. Further, for measurement, an "HLC-8220GPC" manufactured by Tosoh Corporation is used as a gel permeation chromatograph.

The amount of the aliphatic polyester resin in the present exemplary embodiment is preferably from 5% by weight to 95% by weight based on the entire amount of the resin composition, and more preferably from 25% by weight to 75% weight, based on the entire amount of the resin composition. If the amount of the aliphatic polyester resin is from 5% by weight to 95% by weight based on the entire amount of the resin composition, a problem that the appearance of a molded article is deteriorated is suppressed.

Phosphazene Compound

The phosphazene compound in the present exemplary embodiment is an organic compound having a "—P═N— bond" in the molecule, and preferably a resin composition described in (I), which is a phosphazene compound represented by the formula (1).

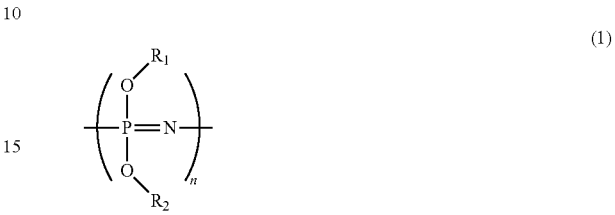

In the formula (1), n represents a repeating number and n is an integer of 3 to 25 in a case where the phosphazene compound is a cyclic compound, or an integer of 3 to 1000 in a case where the phosphazene compound is a straight-chain compound; $R_1$ is a group represented by the formula (2);

$R_2$ is a group selected from the formula (2), the formula (3), and an alkyl group having 1 to 10 carbon atoms or a cycloalkyl group having 3 to 10 carbon atoms;

$R_3$, $R_4$, $R_5$, and $R_6$ are a hydrogen atom or an alkyl group having 1 to 4 carbon atoms; and m is an integer of 1 to 10.

In the phosphazene compound represented by the formula (1), n is preferably from 3 to 30, and m is preferably from 1 to 15. $R_3$, $R_4$, $R_5$, and $R_6$ are preferably a hydrogen atom or a methyl group.

The content of the phosphazene compound in the resin composition of the present exemplary embodiment is, for example, from 5 parts by weight to 60 parts by weight, and preferably from 5 parts by weight to 15 parts by weight, based on 100 parts by weight of the aliphatic polyester resin. In a case where the content of the phosphazene compound based on 100 parts by weight of the aliphatic polyester resin is less than 5 parts by weight, the mechanical strength is poor in some cases when made into a molded product, and in a case where the content of the phosphazene compounds based on 100 parts by weight of the aliphatic polyester resin exceeds 60 parts by weight, the moldability is worsened by bleed out in some cases.

Other Components

The resin composition in the present exemplary embodiment may further contain a crosslinking agent, a plasticizer, an antioxidant, a stabilizer, an ultraviolet ray absorbent, a flame retardant, or a filler.

As the crosslinking agent, a peroxide is preferable, and specific examples of the peroxide include benzoyl peroxide, bis(butylperoxy)trimethylcyclohexane, bis(butylperoxy)cyclododecane, butyl bis(butylperoxy)valerate, dicumyl peroxide, butylperoxybenzoate, dibutylperoxide, bis(butylperoxy) diisopropylbenzene, dimethyldi(butylperoxy)hexane, dimethyldi(butylperoxy)hexyne, and butylperoxycumene, and for example, 2,5-dimethyl-2,5,-di(t-butylperoxy)hexane (trade name: "PERHEXA 25B" (manufactured by NOF Corporation, "PERHEXA" is a trade mark)) is suitable. The blending amount of the peroxide is preferably from 0.1 part by weight to 20 parts by weight, and more preferably from 0.1 part by weight to 10 parts by weight, based on 100 parts by weight of the polylactic acid resin. By blending the crosslinking agent within this range, a resin composition having a high predetermined gel fraction is obtained.

Examples of the plasticizer include glycerol plasticizers such as glycerol diacetate monocaprate (trade name "Rikemal PL-019": manufactured by Riken Vitamin Co., Ltd.) and diglycerol tetraacetate, citric acid plasticizers such as acetyl tributyl citrate and acetyl triethyl citrate, and ether ester plasticizers such as triethylene glycol diacetate and diethylene glycol monostearate, and the plasticizer may be contained in the amount of from 0.1 part by weight to 50 parts by weight based on 100 parts by weight of the polylactic acid resin. If the content of the plasticizer is too high, the bleed out of the plasticizer, reduction of impact resistance of a resin composition, and deterioration of flame retardancy may be easily caused.

Examples of the antioxidant include a phenol antioxidant, an amine antioxidant, a phosphorous antioxidant, a sulfur antioxidant, a hydroquinone antioxidant, and a quinoline antioxidant.

Examples of the stabilizer include nitrogen-containing compounds such as a basic nitrogen-containing compound, for example, a polyamide, a poly-β-alanine copolymer, a polyacrylamide, a polyurethane, a melamine, a cyanoguanidine, and a melamine-formaldehyde condensate; alkali or alkaline earth metal-containing compounds such as an organic carboxylic acid metal salt (calcium stearate, calcium 12-hydroxystearate, and the like), a metal oxide (a magnesium oxide, a calcium oxide, an aluminum oxide, and the like), a metal hydroxide (a magnesium hydroxide, a calcium hydroxide, an aluminum hydroxide, and the like), and a metal carbonate; a zeolite; and a hydrotalcite.

Examples of the ultraviolet ray absorbent include a benzophenone ultraviolet ray absorbent, a benzotriazole ultraviolet ray absorbent, a cyanoacrylate ultraviolet ray absorbent, a salicylate ultraviolet ray absorbent, and an oxalic acid anilide ultraviolet ray absorbent.

Furthermore, the resin composition according to the present exemplary embodiment may also contain other flame retardants unless deteriorating the mechanical strength. Examples of such other flame retardants include a silicone flame retardant, a nitrogen flame retardant, and an inorganic hydroxide flame retardant. Further, the flame retardant may be used singly or in combination of two or more kinds thereof.

As other flame retardants, a synthesized product or a commercially available product may be used. Examples of the phosphorous commercially available flame retardant product include "PX-200" and "X-202", both manufactured by Daihachi Chemical Industry Co., Ltd., "TERRAJU C80" manufactured by BUDENHEIM, and "EXOLIT AP422" and "EXOLIT OP930", both manufactured by Clariant. Examples of the commercially available silicone flame retardant product include "DC4-7081" manufactured by Dow Corning Toray Co., Ltd. Examples of the commercially available nitrogen flame retardant product include "APINON 901" manufactured by SANWA CHEMICAL Co., Ltd., "melamine pyrophosphate" manufactured by Shimonoseki Mitsui Chemicals Inc., and "FP2100" manufactured by ADEKA Corporation. Examples of the commercially available inorganic hydroxide flame retardant product include "MGZ300" manufactured by SAKAI CHEMICAL INDUSTRY Co., Ltd., and "B103ST" manufactured by Nippon Light Metal Co., Ltd.

Moreover, examples of the filler include clay such as kaolin, bentonite, kibushi clay, and gaerome clay, talc, mica, and montmorillonite. Further, examples of other fillers include melamine-containing particles, phosphate particles, and titanium oxide. Further, the other fillers may be used singly or in combination of two or more kinds thereof. Further, a polylactic acid containing clay previously added thereto, for example, "TERRAMAC TE7000" manufactured by UNITIKA Ltd. may also be applied.

Furthermore, the resin composition in the present exemplary embodiment may also contain resins other than the aliphatic polyester resin, a release agent, a weather proofing agent, a light fastness agent, a colorant, or the like.

The resin composition in the present exemplary embodiment is obtained by mixing an aliphatic polyester resin with a phosphazene compound to allow the phosphazene compound to be chemically bonded to the aliphatic polyester resin through a radical reaction, not through a transesterification reaction, thereby introducing a chemically crosslinked structure between the aliphatic polyester resin and the phosphazene compound. The introduction of the chemically crosslinked structure may be carried out in any of a case of the preparation of a resin composition or a case of the preparation of a resin molded product. In addition, the characteristics and blending amounts of the aliphatic polyester resin and the phosphazene compound are the same as described above.

Resin Molded Product

The resin molded product in the present exemplary embodiment is a resin molded product containing a compound in which a vinyl group in a side chain of a phosphazene compound is bonded to an α carbon in an aliphatic polyester resin, and may be obtained by, for example, molding the resin composition in the present exemplary embodiment as described above. For example, the molded product according to the present exemplary embodiment is obtained by performing the molding by a molding method such as injection molding, extrusion molding, blow molding, and hot press molding. In the present exemplary embodiment, those obtained by injection molding the resin composition of the present exemplary embodiment are preferable for the reason of dispersibility of the components in the molded products.

Injection molding is performed by using commercially available apparatus such as "NEX150" manufactured by Nissei Plastic Industrial Co., Ltd., "NEX70000" manufactured by Nissei Plastic Industrial Co., Ltd., and "SE50D" manufactured by Toshiba Machine Co., Ltd., etc. In this case, the cylinder temperature is preferably from 160° C. to 240° C., and more preferably from 170° C. to 210° C. from the viewpoint of the suppression of the decomposition of the polylactic acid. In addition, the mold temperature is preferably from 30° C. to 120° C., and more preferably from 30° C. to 60° C. from the viewpoint of productivity.

Components for Electronic and Electric Equipment

The resin molded product in the present exemplary embodiment described above may be used suitably in the application use, for example, of electronic and electric equipment, household appliances, containers, and automotive interior materials since it may be excellent in the mechanical strength. More specifically, it may be used for casings and various kinds of components for household appliances and electronic and electric equipments, wrapping films, storage cases for CD-ROMs, DVDs, or the like, tablewares, trays for foods, beverage bottles, and drug wrapping materials. Among them, it is suitable for components for electronic and electric equipment. Since most components for electronic and electric equipment have complicated shapes and they are heavy products in terms of weight, high impact strength and surface impact strength are required and the resin molded product of the present exemplary embodiment may sufficiently satisfy such required properties.

EXAMPLES

The present invention will be described specifically with reference to Examples and Comparative Examples but the invention is not limited to the following Examples.

Evaluation of Gel Fraction of Resin Composition

A predetermined amount of each of the respective specimens for evaluation of the resin compositions prepared as described below is wrapped with a 200-mesh stainless steel wire mesh, and boiled in a chloroform solution for 48 hours, and then a gel fraction remaining after excluding a sol fraction dissolved in chloroform is obtained. Chloroform in the gel is removed by drying at 50° C. for 24 hours, the dry weight of the gel fraction is measured, and the gel fraction is calculated by the following equation.

Gel Fraction (%)=(Dry Weight of Gel Fraction)/(Initial Dry Weight)×100

Hereinafter, Preparation Examples of the phosphazene compounds used in Examples and Comparative Examples will be described.

Synthesis Example 1

Synthesis of Triallylphosphazene (B-1)

Into a 5-liter flask equipped with a reflux condenser, a thermometer, and a stirrer, 3,500 mL of toluene is weighed and put, and 720 g (12.4 mol) of 2-propen-1-ol is added thereto, followed by stirring until homogeneous. 74 g (3.2 gram atom) of metallic sodium is introduced thereto at 50° C. or lower, followed by warming to 60° C. over 1 hour after the completion of the introduction, and then stirring at from 60° C. to 68° C. for 4 hours to obtain a solution of 2-propen-1-ol sodium salt.

Furthermore, into the 5-liter flask as described above is put a solution of hexachlorocyclotriphosphazene in toluene (700 g (6.0 unit mol) of hexachlorocyclotriphosphazene, 3,500 mL, of toluene). The slurry solution of 2-propen-1-ol sodium salt is added dropwise thereto at 5° C. or lower over 6 hours, followed by warming to 25° C. and stirring for 4 hours, to obtain a solution of hexaallylcyclotriphosphazene.

After the completion of the reaction, filtration and concentration are carried out, and the resultant is re-dissolved in 5 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 782 g of a brown oily substance.

From the results of $^1$H-NMR and $^{31}$P-NMR measurement, elemental analysis for C, H, and N, and measurement for the phosphorous content, it is confirmed that the brown oily substance is a phosphazene compound having a 2-propenyl group that is an allyl group represented by the formula: [N=P(O—CH$_2$CH=CH$_2$)$_3$] (mixture of trimers: 95%, tetramers: 3%, and pentamers and hexamers: 20). The yield is 98%.

Synthesis Example 2

Synthesis of Trimethallylphosphazene (B-2)

Into a 5-liter flask equipped with a reflux condenser, a thermometer, and a stirrer, 3,500 mL of toluene is weighed and put, and 854 g (12.4 mol) of 2-methyl-2-propen-1-ol is added thereto, followed by stirring until homogeneous. 74 g (3.2 gram atom) of metallic sodium is introduced thereto at 50° C. or lower, followed by warming to 60° C. over 1 hour after the completion of the introduction, and then stirring at from 60° C. to 68° C. for 4 hours to obtain a solution of 2-methyl-2-propen-1-ol sodium salt.

Furthermore, into the 5-liter flask as described above is put a solution of hexachlorocyclotriphosphazene in toluene (700 g (6.0 unit mol) of hexachlorocyclotriphosphazene, 3,500 mL of toluene). The slurry solution of 2-methyl-2-proper-1-ol sodium salt is added dropwise thereto at 5° C. or lower over 6 hours, followed by warming to 25° C. and stirring for 4 hours, to obtain a solution of hexamethallylcyclotriphosphazene.

After the completion of the reaction, filtration and concentration are carried out, and the resultant is re-dissolved in 5 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 768 g of a brown oily substance.

From the results of $^1$H-NMR and $^{31}$P-NMR measurement, elemental analysis for C, H, and N, and measurement for the phosphorous content, it is confirmed that the brown oily substance is a phosphazene compound having a 2-methyl-2-propenyl group that is an allyl group represented by the formula: [[N=P(O—CH$_2$CCH$_3$=CH$_2$)$_2$] (mixture of trimers: 94%, tetramers: 3%, and pentamers and hexamers: 3%). The yield is 95%.

Synthesis Example 3

Synthesis of Cyclic Phosphazene (B-3) Having 2-Propenyl Group

Into a 5-liter flask equipped with a reflux condenser, a thermometer, and a stirrer, 3,500 mL of toluene is weighed and put, and 720 g (12.4 mol) of 2-propen-1-ol is added thereto, followed by stirring until homogeneous. 74 g (3.2 gram atom) of metallic sodium is introduced thereto at 50° C. or lower, followed by warming to 60° C. over 1 hour after the completion of the introduction, and then stirring at from 60° C. to 68° C. for 4 hours to obtain a solution of 2-propen-1-ol sodium salt.

Furthermore, into a 20-liter flask as described above is put a solution of cyclic (n=25) chlorocyclotriphosphazene in toluene (17825 g (6.0 unit mol) of cyclic (n=25) chlorocyclotriphosphazene, 3,500 mL of toluene). The slurry solution of 2-propen-1-ol sodium salt is added dropwise thereto at 5° C. or lower over 6 hours, followed by warming to 25° C. and stirring for 4 hours, to obtain a solution of cyclic allylcyclophosphazene (n=25).

After the completion of the reaction, filtration and concentration are carried out, and the resultant is re-dissolved in 20 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 16789 g of a brown oily substance.

From the results of $^1$H-NMR and $^{31}$P-NMR measurement, elemental analysis for C, H, and N, and measurement for the phosphorous content, it is confirmed that the brown oily substance is a phosphazene compound having a 2-propenyl group that is an allyl group represented by the formula: [N=P (O—CH₂CH═CH₂)₂] (mixture of 25-mers: 94%, and 24-mers or lower: 3%, and 26-mers or higher: 3%). The yield is 72%.

Synthesis Example 4

Synthesis of Phosphazene (B-4) Having 2-Propenyl Group

Into a 5-liter flask equipped with a reflux condenser, a thermometer, and a stirrer, 3,500 mL of toluene is weighed and put, and 29 g (0.5 mol) of 2-propen-1-ol is added thereto, followed by stirring until homogeneous. 3.0 g (0.129 gram atom) of metallic sodium is introduced thereto at 50° C. or lower, followed by warming to 60° C. over 1 hour after the completion of the introduction, and then stirring at from 60° C. to 68° C. for 4 hours to obtain a solution of 2-propen-1-ol sodium salt.

Furthermore, into the 20-liter flask as described above is put a solution of chain (n=1000) chlorocyclotriphosphazene in toluene (57500 g (0.5 unit mol) of chain (n=1000) chlorocyclotriphosphazene, 3,500 mL of toluene). The slurry solution of 2-propen-1-ol sodium salt is added dropwise thereto at 5° C. or lower over 6 hours, followed by warming to 25° C. and stirring for 4 hours, to obtain a solution of chain allylcyclophosphazene (n=1000).

After the completion of the reaction, filtration and concentration are carried out, and the resultant is re-dissolved in 20 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 52100 g of a brown oily substance.

From the results of ¹H-NMR and ³¹P-NMR measurement, elemental analysis for C, H, and N, and measurement for the phosphorous content, it is confirmed that the brown oily substance is a phosphazene compound having a 2-propenyl group that is an allyl group represented by the formula: [N═P (O—CH₂CH═CH₂)₂] (mixture of 1000-mers: 85%, 999-mers or lower: 12%, and 1001-mers or higher: 3%). The yield is 68%.

Synthesis Example 5

Synthesis of Phosphazene (B-5) Having 2-Dodecenyl Group

Into a 5-liter flask equipped with a reflux condenser, a thermometer, and a stirrer, 3,500 mL of toluene is weighed and put, and 1141 g (6.2 mol) of 2-dodecen-1-ol and 583 g (6.2 mol) of phenol are added thereto, followed by stirring until homogeneous. 74 g (3.2 gram atom) of metallic sodium is introduced thereto at 50° C. or lower, followed by warming to 60° C. over 1 hour after the completion of the introduction, and then stirring at from 60° C. to 68° C. for 4 hours to obtain a solution of 2-dodecen-1-ol sodium salt and phenol sodium salt.

Furthermore, into the 5-liter flask as described above is put a solution of hexachlorocyclotriphosphazene in toluene (700 g (6.0 unit mol) of hexachlorocyclotriphosphazene, 3,500 mL of toluene). The slurry solution of 2-dodecen-1-ol sodium salt and phenol sodium salt is added dropwise thereto at 5° C. or lower over 6 hours, followed by warming to 25° C. and stirring for 4 hours, to obtain a solution of hexaallylcyclotriphosphazene.

After the completion of the reaction, filtration and concentration are carried out, and the resultant is re-dissolved in 20 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 1523 g of a brown oily substance.

From the results of ¹H-NMR and ³¹P-NMR measurement, elemental analysis for C, H, and N, and measurement for the phosphorous content, it is confirmed that the brown oily substance is a phosphazene compound having a 2-dodecenyl group that is an allyl group represented by the formula: [N═P (O—(CH₂)₁₀CH═CH₂)₁(O—C₆H₁₀)₁] (mixture of trimers: 90%, tetramers: 6%, and pentamers and hexamers: 4%). The yield is 81%.

Synthesis Example 6

Synthesis of Phosphazene (B-6) Having 2-Dodecenyl Group

Into a 5-liter flask equipped with a reflux condenser, a thermometer, and a stirrer, 3,500 mL of toluene is weighed and put, and 1141 g (6.2 mol) of 2-dodecen-1-ol and 583 g (6.2 mol) of phenol are added thereto, followed by stirring until homogeneous. 74 g (3.2 gram atom) of metallic sodium is introduced thereto at 50° C. or lower, followed by warming to 60° C. over 1 hour after the completion of the introduction, and then stirring at from 60° C. to 68° C. for 4 hours to obtain a solution of 2-dodecen-1-ol sodium salt and phenol sodium salt.

Furthermore, into the 5-liter flask as described above is put a solution of octachlorocyclotriphosphazene in toluene (3090 g (6.0 unit mol) of octachlorocyclotriphosphazene, 3,500 mL of toluene). The slurry solution of 2-dodecen-1-ol sodium salt and phenol sodium salt is added dropwise thereto at 5° C. or lower over 6 hours, followed by warming to 25° C. and stirring for 4 hours, to obtain a solution of triphosphazene.

After the completion of the reaction, filtration and concentration are carried out, and the resultant is re-dissolved in 20 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 2823 g of a brown oily substance.

From the results of ¹H-NMR and ³¹P-NMR measurement, elemental analysis for C, H, and N, and measurement for the phosphorous content, it is confirmed that the brown oily substance is a phosphazene compound having a 2-dodecenyl group that is an allyl group represented by the formula: [N═P (O—(CH₂)₁₀CH═CH₂)₁(O—C₆H₁₀)₁] (mixture of trimers: 92%, tetramers: 7%, and pentamers and hexamers: 1%). The yield is 87%.

Synthesis Example 7

Synthesis of Phosphazene (B-7) Having 2-Heptenyl Group

Into a 5-liter flask equipped with a reflux condenser, a thermometer, and a stirrer, 3,500 mL of toluene is weighed and put, and 707 g (6.2 mol) of 2-hepten-1-ol and 459 g (6.2 mol) of n-butyl alcohol are added thereto, followed by stirring until homogeneous. 74 g (3.2 gram atom) of metallic sodium is introduced thereto at 50° C. or lower, followed by warming to 60° C. over 1 hour after the completion of the introduction, and then stirring at from 60° C. to 68° C. for 4 hours to obtain a solution of 2-hepten-1-ol sodium salt and n-butyl alcohol sodium salt.

Furthermore, into the 5-liter flask as described above is put a solution of octachlorocyclotriphosphazene in toluene (3090 g (6.0 unit mol) of octachlorocyclotriphosphazene, 3,500 mL of toluene). The slurry solution of 2-hepten-1-ol sodium salt and n-butyl alcohol sodium salt is added dropwise thereto at 5° C. or lower over 6 hours, followed by warming to 25° C. and stirring for 4 hours, to obtain a solution of triphosphazene.

After the completion of the reaction, filtration and concentration are carried out, and the resultant is re-dissolved in 20 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 2743 g of a brown oily substance.

From the results of $^1$H-NMR and $^{31}$P-NMR measurement, elemental analysis for C, H, and N, and measurement for the phosphorous content, it is confirmed that the brown oily substance is a phosphazene compound having a 2-heptenyl group that is an allyl group represented by the formula: $[N=P(O-(CH_2)_{10}CH=CH_2)_1(O-C_6H_{10})_1]$ (mixture of trimers: 89%, tetramers: 7%, and pentamers and hexamers: 4%). The yield is 81%.

Synthesis Example 8

Synthesis of Hydroxyphenylphosphazene (B-8) Partially Having Hydroxyl Group

Into a 5-liter flask equipped with a reflux condenser, a thermometer, and a stirrer, 3,500 mL of toluene is weighed and put, and 770 g (6.2 mol) of 4-methoxyphenol and 670 g (6.2 mol) of p-cresol are added thereto, followed by stirring until homogeneous. 74 g (3.2 gram atom) of metallic sodium is introduced thereto at 50° C. or lower, followed by warming to 60° C. over 1 hour after the completion of the introduction, and then stirring at from 60° C. to 68° C. for 4 hours to obtain a solution of 4-methoxyphenol sodium salt and p-cresol sodium salt.

Furthermore, into the 5-liter flask as described above is put a solution of hexachlorocyclotriphosphazene in toluene (2155 g (6.0 unit mol) of hexachlorocyclotriphosphazene, 3,500 mL of toluene). The slurry solution of 4-methoxyphenol sodium salt and p-cresol sodium salt is added dropwise thereto at 5° C. or lower over 6 hours, followed by warming to 25° C. and stirring for 4 hours, to obtain a solution of triphosphazene.

After the completion of the reaction, filtration and concentration are carried out, and the resultant is re-dissolved in 20 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 1988 g of a brown oily substance.

From the results of $^1$H-NMR and $^{31}$P-NMR measurement, elemental analysis for C, H, and N, and measurement for the phosphorous content, it is confirmed that the brown oily substance is a hydroxyphenylphosphazene compound partially having a hydroxyl group represented by the formula: $[N=P(O-C_6H_4OH)_1(O-C_6H_4CH_3)_1]$ (mixture of trimers: 93%, tetramers: 4%, and pentamers and hexamers: 3%). The yield is 90%.

Synthesis Example 9

Synthesis of Phenoxyphosphazene Compound (B-9)

Into a 5-liter flask equipped with a reflux condenser, a thermometer, and a stirrer, 3,500 mL of toluene is weighed and put, and 1167 g (12.4 mol) of phenol is added thereto, followed by stirring until homogeneous. 74 g (3.2 gram atom) of metallic sodium is introduced thereto at 50° C. or lower, followed by warming to 60° C. over 1 hour after the completion of the introduction, and then stirring at from 60° C. to 68° C. for 4 hours to obtain a solution of phenol sodium salt.

Furthermore, into the 5-liter flask as described above is put a solution of hexachlorocyclotriphosphazene in toluene (2155 g (6.0 unit mol) of hexachlorocyclotriphosphazene, 3,500 mL of toluene). The slurry solution of phenol sodium salt is added dropwise thereto at 5° C. or lower over 6 hours, followed by warming to 25° C. and stirring for 4 hours, to obtain a solution of triphosphazene.

After the completion of the reaction, filtration and concentration are carried out, and the resultant is re-dissolved in 20 liters of chlorobenzene, washed with a 5% aqueous sodium hydroxide solution three times and with 5% hydrochloric acid once, neutralized with a 7% sodium bicarbonate solution, and then washed with water twice. Thereafter, chlorobenzene is distilled away under reduced pressure to obtain 2088 g of a brown oily substance.

From the results of $^1$H-NMR and $^{31}$P-NMR measurement, elemental analysis for C, H, and N, and measurement for the phosphorous content, it is confirmed that the brown oily substance is a phenoxyphosphazene compound represented by the formula: $[N=P(O-C_6H_5)_2]$ (mixture of trimers: 97%, tetramers: 2%, pentamers and hexamers: 1%). The yield is 95%.

Example 1

In the compositions (all expressed in "part (s) by weight") shown in Table 1, 100 parts by weight of a polylactic acid resin (trade name "Ingeo3001D", manufactured by Nature Works LLC, weight average molecular weight: 150,000) as an aliphatic polyester resin is mixed with 10 parts by weight of the phosphazene compound obtained in Synthesis Example 1, and then the resultant is supplied into a hopper of a twin-screw extruder (TEX-30α, manufactured by Japan Steel Works). A blend resin is supplied thereto, followed by melt-kneading extrusion at a cylinder temperature and a die temperature of 190° C., a screw rotation speed of 250 rpm, a degree of suction of a vent of 100 MPa, and a discharge amount of 10 kg/h. During the melt-kneading, a solution containing 1.0 part by weight of "PERHEXA 25B", trade name, manufactured by NOF Corporation that is a peroxide as a crosslinking agent dissolved in 2.5 parts by weight of glycerol diacetate monocaprate (trade name "Rikemal PL-019": manufactured by Riken Vitamin Co., Ltd.) as a plasticizer is injected into the twin-screw extruder using a pump. Further, the resin discharged from the twin-screw extruder is cut into pellet shapes, to obtain pellets. The gel fraction of the resin composition in the shape of pellets thus obtained is 98%.

The obtained resin composition is dried at 80° C. for 4 hours using a hot air dryer, and then injection molded at a cylinder temperature of 220° C. by an injection molding machine. A heat-and-cool molding is performed in which the mold is cooled at 110° C. for 50 seconds, and then rapidly cooled to 60° C. to obtain a predetermined resin molded product (specimen for evaluation).

Comparative Example 1

According to Example 1 except that in the composition shown in Table 1 a phosphazene compound is not blended, a specimen for evaluation is obtained.

Examples 2 to 7 and Comparative Examples 2 to 3

According to Example 1 except that in the composition shown in Table 1, one kind of phosphazene compound is selected from the group consisting of the phosphazene compounds obtained in Synthesis Examples 2 to 9 and used instead of the phosphazene compound obtained in Synthesis Example 1, a specimen for evaluation is obtained.

Examples 8 and 9

According to Example 1 except that in the composition shown in Table 1, the addition amount of the phosphazene compound obtained in Synthesis Example 2 as blended is set to the ratio shown in Table 1 based on 100 parts of by weight of a polylactic acid resin (trade name "Ingeo3001D", manufactured by Nature Works LLC, weight average molecular weight: 150,000) as the aliphatic polyester resin, a specimen for evaluation is obtained.

Measurement and Evaluation

Using the specimens obtained, the following measurement and evaluation is carried out. The results are shown in Table 1.

Evaluation of Gel Fraction of Resin Composition

A predetermined amount of a UL specimen for a V test (thickness of 1.6 mm) in UL-94 is wrapped with a 200-mesh stainless steel wire mesh, and boiled in a chloroform solution for 48 hours, and then a gel fraction remaining after excluding a sol fraction dissolved in chloroform is obtained. Chloroform in the gel is removed by drying at 50° C. for 24 hours, the dry weight of the gel fraction is measured, and the gel fraction is calculated by the following equation.

Gel Fraction (%)=(Dry Weight of Gel Fraction)/(Initial Dry Weight)×100

Evaluation of Bond Form

Using an FT-NMR apparatus, "JNM-EC500" (manufactured by JEOL Ltd.), the UL specimen for a V test (thickness of 1.6 mm) in UL-94 is measured by $^1$H solid NMR, it is confirmed that "=CH" and "=CH$_2$" derived from the allyl group-containing cyclic phosphazene compound are not detected in an NMR spectrum and crosslinking is formed. Similarly, for the respective specimens for evaluation, using a Fourier transform infrared spectrophotometer, "IRAffinity-1" (manufactured by Shimadzu Corporation), it is confirmed that "=C—H" and (C=C) derived from the allyl group-containing cyclic phosphazene compound are not detected in an infrared absorption spectrum and crosslinking is formed.

Heat Distortion Temperature

While applying a load (1.8 MPa) defined in the standard test method of ASTM D648, the temperature of the specimen is raised, and a temperature at which the magnitude of the deflection reaches a defined value (deflection temperature under load: DTUL) is measured.

Tensile Strength

The tensile strength of the molded product is measured in accordance with JIS K-7113. Further, as the molded product, No. JIS1 specimen (thickness of 4 mm) obtained by injection molding is used.

Test Method for Impact Resistance

In accordance with JIS K7111 using a digital impact tester (manufactured by Toyo Seiki Co., Ltd., DG-5), under the conditions at a lift angle of 150°, and a hammer used at 2.0 J, and the number of measurements, n=10, an ISO multi-purpose dumbbell test specimen subjected to notch processing is tested for Charpy impact strength (unit: kJ/m$^2$) in the MD direction. A large numerical value of the Charpy impact strength indicates excellent impact resistance.

Burning Test for Flame Retardancy

A UL specimen (thickness of 1.6 mm) for a V test in UL-94 is subjected to a UL-V test in accordance with the method defined in UL-94, and the "degree of difficulty in burning of the specimen" is measured.

Test Methods for V-2, V-1, and V-0

In the three test methods, the lower end of the specimen held vertically is commonly applied to a flame using a gas burner flame for 10 seconds. Once the burning stops within 30 seconds, flame application is performed again for 10 seconds. In addition, the evaluation criteria are as defined in the standard UL-94 on flammability.

TABLE 1

| Composition | | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 |
|---|---|---|---|---|---|---|---|---|---|---|---|---|---|
| Aliphatic polyester resin | Polylactic acid | 100 | 100 | 100 | 100 | 100 | 100 | 100 | 100 | 100 | 100 | 100 | 100 |
| Phosphazene compound | Phosphazene compound of Syn. Ex. 1 | 10 | — | — | — | — | — | — | — | — | — | — | — |
| | Phosphazene compound of Syn. Ex. 2 | — | 10 | — | — | — | — | — | 8 | 12 | — | — | — |
| | Phosphazene compound of Syn. Ex. 3 | — | — | 10 | — | — | — | — | — | — | — | — | — |
| | Phosphazene compound of Syn. Ex. 4 | — | — | — | 10 | — | — | — | — | — | — | — | — |
| | Phosphazene compound of Syn. Ex. 5 | — | — | — | — | 10 | — | — | — | — | — | — | — |
| | Phosphazene compound of Syn. Ex. 6 | — | — | — | — | — | 10 | — | — | — | — | — | — |
| | Phosphazene compound of Syn. Ex. 7 | — | — | — | — | — | — | 10 | — | — | — | — | — |
| | Phosphazene compound of Syn. Ex. 8 | — | — | — | — | — | — | — | — | — | — | 10 | — |
| | Phosphazene compound of Syn. Ex. 9 | — | — | — | — | — | — | — | — | — | — | — | 10 |
| Crosslinking agent | "PERHEXA 25B" (manufactured by NOF Corporation) | 1 | 1 | 1 | 1 | 1 | 1 | 1 | 1 | 1 | 1 | 1 | 1 |
| Plasticizer | Glycerol diacetate monocaprate | 2.5 | 2.5 | 2.5 | 2.5 | 2.5 | 2.5 | 2.5 | 2.5 | 2.5 | 2.5 | 2.5 | 2.5 |
| Evaluation results | | | | | | | | | | | | | |

TABLE 1-continued

| Composition | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 |
|---|---|---|---|---|---|---|---|---|---|---|---|---|
| Gel fraction (%) | 99< | 99< | 89 | 92 | 85 | 86 | 82 | 99< | 99< | 0 | 5 | 0 |
| Deflection temperature under load (° C.) | 59 | 61 | 56 | 54 | 56 | 57 | 55 | 58 | 61 | 50 | 45 | 45 |
| Tensile strength (MPa) | 65 | 68 | 62 | 61 | 60 | 62 | 61 | 64 | 66 | 59 | 55 | 54.0 |
| Charpy impact strength (kJ/m$^2$) ⅛"@23° C. | 10 | 12 | 13 | 11 | 12 | 11 | 9 | 10 | 11 | 3 | 2 | 2 |
| Flame retardancy (UL94: 1.6 mm) | V-0 | V-0 | V-0 | V-0 | V-0 | V-0 | V-0 | V-0 | V-0 | not-V | not-V | not-V |

INDUSTRIAL APPLICABILITY

As application examples, the present invention may be applied in resin molded products for electronic and electric equipment, household appliances, containers, automotive interior materials, and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising a compound in which a vinyl group in a side chain of a phosphazene compound is reacted to bond to an α carbon in an aliphatic polyester resin.

2. The resin composition according to claim 1, wherein the phosphazene compound is a phosphazene compound represented by the formula (1):

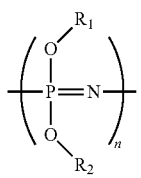

(1)

wherein n represents a repeating number and n is an integer of 3 to 25 in a case where the phosphazene compound is a cyclic compound, or an integer of 3 to 1000 in a case where the phosphazene compound is a straight-chain compound; $R_1$ is a group represented by the formula (2);

$R_2$ is a group selected from the formula (2), the formula (3), and an alkyl group;

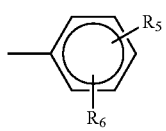

(3)

$R_3$, $R_4$, $R_5$, and $R_5$ are a hydrogen atom or an alkyl group having 1 to 4 carbon atoms; and m is an integer of 1 to 10.

3. The resin composition according to claim 1, wherein a content of the phosphazene compound is from 5 parts by weight to 60 parts by weight based on 100 parts by weight of the aliphatic polyester resin.

4. The resin composition according to claim 1, wherein a content of the phosphazene compound is from 5 parts by weight to 15 parts by weight based on 100 parts by weight of the aliphatic polyester resin.

5. The resin composition according to claim 1, wherein the compound is obtained by mixing an aliphatic polyester resin with a phosphazene compound to allow the phosphazene compound to be chemically bonded to the aliphatic polyester resin through a radical reaction, thereby introducing a chemically crosslinked structure between the aliphatic polyester resin and the phosphazene compound.

6. A resin molded product comprising a compound in which a vinyl group in a side chain of a phosphazene compound is reacted to bond to an α carbon in an aliphatic polyester resin.

7. The resin molded product according to claim 6, wherein the phosphazene compound is a phosphazene compound represented by the formula (1):

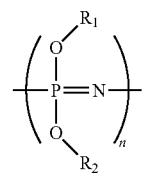

(1)

wherein n represents a repeating number and n is an integer of 3 to 25 in a case where the phosphazene compound is a cyclic compound, or an integer of 3 to 1000 in a case where the phosphazene compound is a straight-chain compound; $R_1$ is a group represented by the formula (2);

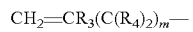

$R_2$ is a group selected from the formula (2), the formula (3), and an alkyl group;

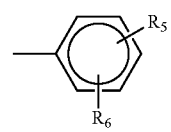

(3)

$R_3$, $R_4$, $R_5$, and $R_6$ are a hydrogen atom or an alkyl group having 1 to 4 carbon atoms; and m is an integer of 1 to 10.

8. The resin molded product according to claim 6, wherein a content of the phosphazene compound is from 5 parts by weight to 60 parts by weight based on 100 parts by weight of the aliphatic polyester resin.

9. The resin molded product according to claim 6, wherein a content of the phosphazene compound is from 5 parts by weight to 15 parts by weight based on 100 parts by weight of the aliphatic polyester resin.

10. The resin molded product according to claim 6, wherein the compound is obtained by mixing an aliphatic polyester resin with a phosphazene compound to allow the phosphazene compound to be chemically bonded to the aliphatic polyester resin through a radical reaction, thereby introducing a chemically crosslinked structure between the aliphatic polyester resin and the phosphazene compound.

\* \* \* \* \*